(12) United States Patent
Chen

(10) Patent No.: US 12,103,569 B2
(45) Date of Patent: Oct. 1, 2024

(54) VACUUM PIPELINE MAGNETIC LEVITATION CONVEYING DEVICE

(71) Applicant: Tsunami Energy Enterprise Pty Ltd, Vic (AU)

(72) Inventor: Xiaojian Chen, Wa (AU)

(73) Assignee: TSUNAMI ENERGY ENTERPRISE PTY LTD, Vic (AU)

( * ) Notice: Subject to any disclaimer, the term of this patent is extended or adjusted under 35 U.S.C. 154(b) by 0 days.

(21) Appl. No.: 18/591,013

(22) Filed: Feb. 29, 2024

(65) Prior Publication Data

US 2024/0253672 A1  Aug. 1, 2024

Related U.S. Application Data

(63) Continuation of application No. PCT/CN2023/137903, filed on Dec. 11, 2023.

(30) Foreign Application Priority Data

Jan. 31, 2023 (AU) .............................. 2023900218
Nov. 10, 2023 (CN) ........................... 2023114955322

(51) Int. Cl.
*B61B 13/12* (2006.01)
*B60L 13/04* (2006.01)
(Continued)

(52) U.S. Cl.
CPC .............. *B61B 13/12* (2013.01); *B60L 13/04* (2013.01); *B61B 1/00* (2013.01); *B61B 13/10* (2013.01);
(Continued)

(58) Field of Classification Search
CPC ......... E01B 25/305; B61B 1/00; B61B 13/12; B61B 13/04; B61B 13/10
See application file for complete search history.

(56) References Cited

U.S. PATENT DOCUMENTS

| 2,511,979 | A | * | 6/1950 | Goddard | .................. B60V 3/04 |
| | | | | | 104/138.1 |
| 3,508,497 | A | * | 4/1970 | Kosuke | ................... B61B 13/10 |
| | | | | | 104/138.1 |

(Continued)

FOREIGN PATENT DOCUMENTS

WO    WO-2020169411 A1 *  8/2020 ........... B21C 37/155

*Primary Examiner* — Scott A Browne
(74) *Attorney, Agent, or Firm* — WPAT, PC

(57) ABSTRACT

A vacuum pipeline magnetic levitation conveying device is provided, the device includes: multiple sites sequentially connected through the vacuum pipeline; three fixed tracks parallel to each other, are disposed in the vacuum pipeline, and extend along an extension direction of the vacuum pipeline, where the three fixed tracks determine a circumscribed circle, and the three fixed tracks are evenly distributed on the circumscribed circle; the train disposed in the vacuum pipeline, where a body of the train is provided with three moving tracks, the three moving tracks are evenly distributed around the train and are parallel to each other; three fixed tracks, where the three moving tracks correspond to the three fixed tracks one by one, and the three moving tracks are coupled with the fixed tracks in a magnetic levitation manner, which makes a guiding running of the train inside the vacuum pipeline safer and more stable.

16 Claims, 11 Drawing Sheets

(51) Int. Cl.
    *B61B 1/00*      (2006.01)
    *B61B 13/10*     (2006.01)
    *E01B 25/30*     (2006.01)

(52) U.S. Cl.
    CPC ......... *E01B 25/305* (2013.01); *B60L 2200/26* (2013.01)

(56) References Cited

U.S. PATENT DOCUMENTS

| | | | | |
|---|---|---|---|---|
| 4,512,258 | A * | 4/1985 | Matsukata | B61B 13/10 244/113 |
| 5,146,853 | A * | 9/1992 | Suppes | B60L 15/005 104/282 |
| 10,370,204 | B2 * | 8/2019 | Bambrogan | B65G 67/24 |
| 11,346,059 | B2 * | 5/2022 | Radziszewski | E04B 1/3205 |
| 11,745,240 | B2 * | 9/2023 | Van Kol | B21C 37/154 138/148 |
| 2011/0259236 | A1 * | 10/2011 | Kwon | B61B 13/10 701/19 |
| 2014/0261054 | A1 * | 9/2014 | Oster | E01B 25/30 104/130.02 |
| 2021/0316616 | A1 * | 10/2021 | Mielczarek | B60L 13/10 |
| 2021/0370992 | A1 * | 12/2021 | Radziszewski | B61C 3/00 |
| 2022/0144100 | A1 * | 5/2022 | Tamutus | E01B 25/34 |

\* cited by examiner

VACUUM PIPELINE MAGNETIC
LEVITATION CONVEYING DEVICE

TECHNICAL FIELD

The disclosure relates to the technical field of rail-based transportation systems, and more particularly to a vacuum pipeline magnetic levitation conveying device.

BACKGROUND

A vacuum pipeline magnetic levitation conveying device generally includes a vacuum pipeline, a track, a train and multiple sites, the sites are sequentially connected through the vacuum pipeline, the track is disposed in the vacuum pipeline and extends along a direction of the vacuum pipeline, and the train is disposed in the vacuum pipeline and is supported on the track through magnetic levitation. An air pressure in the vacuum pipeline is very small, and there is basically no resistance between the train and the track, thus the train can run at a high speed, which reaches 1000-20000 kilometers per hour (km/h).

In a current design scheme of the vacuum pipeline magnetic levitation conveying device, a bottom of the train is generally levitated above the track by magnetic force. FIG. 1 illustrates a schematic diagram of a scheme of magnetic levitation at the bottom of the train above the track, and in the scheme, a section of each track is T-shaped; the track includes a track body, a first cantilever extending to left from the track body, and a second cantilever extending to right form the track body, and the first cantilever and the second cantilever are located on an upside of the track body; the bottom of the train defines a track through groove with a downward opening, an upside of the track is accommodated in the track through groove, and the track through groove is provided with a first groove wall corresponding to a lower surface of the first cantilever, a second groove wall corresponding to a lower surface of the second cantilever, a third groove wall corresponding to an end of the first cantilever and a fourth groove wall corresponding to an end of the second cantilever; the lower surface of the first cantilever and the lower surface of the second cantilever are provided with first electromagnets, the first groove wall and the second groove wall are respectively provided with second electromagnets corresponding to the first electromagnets, and the third groove wall and the fourth groove wall are respectively provided with third electromagnets; the first electromagnets and the second electromagnets attract each other, the first electromagnets and the third electromagnets attract or repel each other, so that the train is stably supported on the track through magnetic levitation. FIG. 1 illustrates a schematic diagram of another scheme of magnetic levitation at the bottom of the train above the track, and in the scheme, each track defines a groove (i.e., a section of the track is in a "凹" shape), the bottom of the train is provided with a downward lug boss, the lug boss is accommodated in the groove of the track, a lower surface of the lug boss is provided with a first electromagnet, and a second electromagnet with the "凹" shape is disposed along a wall of the groove of the track; and the first electromagnet and the second electromagnet repel each other, so that the train is stably supported on the track through magnetic levitation.

However, the schemes of magnetic levitation at the bottom of the train above the track mentioned above may result in unstable guidance during high-speed running, which can easily cause damage to the track, the train, and the vacuum pipeline. Specifically, an enormous centrifugal force generated by the train during high-speed turning can exert significant impacts on the train, the track, and the vacuum pipeline, and resulting in fatigue damage to components. When the train goes uphill (upward), the train will exert greater downward pressure on the track, so that the track generates greater upward thrust on the train to maintain balance; when the train transitions from upward to horizontal running, the pressure of the train on the track is decreased, while the pressure of the track on the train cannot be reduced in time, causing the train to jump up and fall onto the track. When the train goes downhill (downward), the train tends to move horizontally forward and leaves the track more; when the train transitions from downhill to horizontal running, the train will fall to a normal horizontal position. And the above up and down jumps generated by the train on uphill and downhill slopes can also exert a huge impact on the train, the track, and the vacuum pipeline, and causing fatigue damage to the components.

Therefore, it is urgent to have an improved vacuum pipeline magnetic levitation conveying device.

SUMMARY

Technical problems to be solved of the disclosure are as follows.

The disclosure solves, at least a certain extent, the problems existing in the above related art. Therefore, the disclosure provides a vacuum pipeline magnetic levitation conveying device, which makes a train to be guided to run more safely and stably in a vacuum pipeline.

Technical solutions of the disclosure are as follows.

In order to achieve the above purpose, main technical solutions adopted in the disclosure are as follows.

The disclosure provides a vacuum pipeline magnetic levitation conveying device (i.e., a hyperloop), and the conveying device includes a vacuum pipeline, a train, three fixed tracks and multiple sites; the multiple sites are sequentially connected through the vacuum pipeline; the three fixed tracks are parallel to each other and disposed in the vacuum pipeline, and the three fixed tracks each extend along an extension direction of the vacuum pipeline; the three fixed tracks together define a circumscribed circle, and the three fixed tracks are evenly distributed at an angle of 120° from each other on the circumscribed circle; the train is disposed in the vacuum pipeline, a body of the train is provided with three moving tracks, the three moving tracks are parallel to each other and evenly distributed around the train; and the three moving tracks correspond to the three fixed tracks one by one, and the three moving tracks are respectively coupled to the three fixed tracks in a magnetic levitation manner.

In an embodiment, the three fixed tracks are a first fixed track, a second fixed track and a third fixed track, respectively; the first fixed track is disposed on a top of the vacuum pipeline and is located on a middle of the vacuum pipeline, and the second fixed track and the third fixed track are disposed on a bottom of the vacuum pipeline and are respectively located on two sides of the first fixed track; or the first fixed track is disposed on a bottom of the vacuum pipeline and is located on a middle of the vacuum pipeline, and the second fixed track and the third fixed track are disposed on a top of the vacuum pipeline and are respectively located on two sides of the first fixed track.

In an embodiment, each of the three moving tracks includes multiple track blocks arranged at intervals along an extension direction of the train.

In an embodiment, the three moving tracks are a first moving track, a second moving track and a third moving track, respectively; and the first moving track is coupled to the first fixed track in a magnetic levitation manner, the second moving track is coupled to the second fixed track in a magnetic levitation manner, and the third moving track is coupled to the third fixed track a magnetic levitation manner; in the first moving track, an interval between adjacent two of the multiple track blocks is in a range of 0.3-0.9 centimeters (cm), and a length of each of the multiple track blocks is in a range of 10-30 cm; in the second moving track, an interval between adjacent two of the multiple track blocks is in a range of 1.4-2.2 cm, and a length of each of the multiple track blocks is in a range of 10-30 cm; and in the third moving track, an interval between adjacent two of the multiple track blocks is in a range of 1.4-2.2 cm, a length of each of the multiple track blocks is in a range of 10-30 cm.

In an embodiment, the train includes a first head, a loading part and a second head connected sequentially, the first head and the second head are both in a streamlined cone shape, the loading part is in a cylindrical shape, and the loading part is provided with passenger seats therein.

In an embodiment, each of the three moving track includes a convex part, each of the three fixed track defines a through groove with an opening facing towards the convex part, the convex part is matched with and engaged in the through groove to form a moving and fixed track coupling part, and the moving and fixed track coupling part has a ball-and-socket structure; and the convex part is provided with a superconductor, the through groove is provided with a permanent magnet therein, and an interaction between the superconductor and the permanent magnet makes the three moving track be coupled to the three fixed tracks in a magnetic levitation manner.

In an embodiment, the vacuum pipeline includes an inner pipeline and an outer pipeline sleeved in the inner pipeline, the train and the three fixed tracks are disposed in the inner pipeline, an inner space of the inner pipeline is evacuated to 1 thousandth (1‰)-0.1% of a standard atmospheric pressure, and a space between the inner pipeline and the outer pipeline is evacuated to 1%-4% of the standard atmospheric pressure.

In an embodiment, the vacuum pipeline magnetic levitation conveying device further includes a connection unit; the connection unit includes: a platform, a starting covered bridge, a first straightened covered bridge, a second straightened covered bridge, a first drive assembly, a second drive assembly, a third drive assembly, a fourth drive assembly and a corrugated telescopic sleeve;
  a first end of the starting covered bridge is fixedly connected to the platform, a second end of the starting covered bridge is disposed facing towards a door of the train, and the starting covered bridge is provided with a first walking board therein for passengers to get on and off;
  the first straightened covered bridge is telescopically supported in the starting covered bridge, the first straightened covered bridge includes: a first covered bridge part and a second covered bridge part, and the first covered bridge part and the second covered bridge part are sequentially arranged along a telescopic direction; the second covered bridge part is provided with a second walking board therein for the passengers to get on and off, the second walking board is superposed on the first walking board, and the second walking board is linearly and slidably connected to the first walking board along the telescopic direction; an installation end of the first drive assembly is installed on the starting covered bridge, a moving end of the first drive assembly is installed on the first covered bridge part, an installation end of the second drive assembly is installed on the first covered bridge part, a moving end of the second drive assembly is installed on the second covered bridge part; the first drive assembly is configured to drive the first straightened covered bridge to move linearly along the telescopic direction, to thereby make the second walking board to move to a first swinging position relative to the first walking board; and in the first swinging position, the second covered bridge part completely extends out of the starting covered bridge, and the second drive assembly is configured to drive the second covered bridge part to swing horizontally relative to the first covered bridge part;
  the second straightened covered bridge is telescopically supported in the second covered bridge part, the second straightened covered bridge includes: a third covered bridge part and a fourth covered bridge part, and the third covered bridge part and the fourth covered bridge part are sequentially arranged along the telescopic direction; the fourth covered bridge part is provided with a third walking board therein for the passengers to get on and off, the third walking board is superposed on the second walking board, and the third walking board is linearly and slidably connected to the second walking board along the telescopic direction; an installation end of the third drive assembly is installed on the second covered bridge part, a moving end of the third drive assembly is installed on the third covered bridge part, an installation end of the fourth drive assembly is installed on the third covered bridge part, and a moving part of the fourth drive assembly is installed on the fourth covered bridge part; the third drive assembly is configured to drive the second straightened covered bridge to move linearly along the telescopic direction, to thereby make the third walking board to move to a second swinging position relative to the second walking board; and in the second swinging position, the fourth covered bridge part completely extends out of the second covered bridge part, and the fourth drive assembly is configured to drive the fourth covered bridge part to swing horizontally relative to the third covered bridge part; and
  an end of the second straightened covered bridge is provided with a circular installation position, the circular installation position is connected to the platform through the corrugated telescopic sleeve, and the starting covered bridge, the first straightened covered bridge and the second straightened covered bridge are accommodated in the corrugated telescopic sleeve.

In an embodiment, the connection unit further includes: a connection covered bridge and a fifth drive assembly; the connection covered bridge is telescopically supported in the fourth covered bridge part, and the fourth covered bridge part is provided with a fourth walking board therein for the passengers to get on and off; the fourth walking board is superposed on the third walking board, and the fourth walking board is linearly and slidably connected to the third walking board along the telescopic direction; an installation end of the fifth drive assembly is installed on the fourth covered bridge part, a moving end of the fifth drive assembly is installed on the connection covered bridge; the fifth drive assembly is configured to drive the connection covered bridge to move linearly along the telescopic direction, to thereby make the fourth walking board to move to a connecting position relative to the third walking board; and in the connecting position, a second end of the connection covered bridge is connected to the door of the train; and
an end of the connection covered bridge is provided with a circular installation position, the circular installation position is connected to the platform through the corrugated telescopic sleeve, and the starting covered bridge, the first straightened covered bridge, the second straightened covered bridge and the connection covered bridge are accommodated in the corrugated telescopic sleeve.

In an embodiment, the second drive assembly and the fourth drive assembly are both hydraulic cylinders.

Beneficial effects of the disclosure are as follows.

The vacuum pipeline magnetic levitation conveying device is provided in the disclosure and includes the moving and fixed track magnetic levitation coupling parts, which are evenly distributed at 120° from each other along the circumference, in a first aspect, the conveying device can provide the driving force, support and guidance for the train, which can keep the train on the tracks more stably when the train turns or goes up and down a ramp, and greatly improve a guidance function of the tracks and the vacuum pipeline on the train, thus reducing a turning radius of the train, the train is always firmly confined between three tracks, when the train runs, amplitudes of swinging from side to side and jumping up and down are very small, so the train body runs smoothly, has no tendency to roll over, never derails, and its safety is greatly improved, and a comfortable ride experience is provided to the passengers; in a second aspect, during the train runs, the conveying device can better balance and disperse the pressure (e.g., impact force) from all sides, the enormous centrifugal force generated during the train turns at a high speed or the enormous pressure generated during the train goes up and down the ramp is shared by the three moving and fixed track coupling parts, and is uniformly distributed around the circumference, so as to reduce up-and-down oscillation and left-and-right swing during the train runs, reduce fatigue damage of parts such as the train, the tracks and the vacuum pipeline, and improve safety and stability of the train running; and in a third aspect, an allowable value of the conveying device for track installation and manufacturing error is large, according to an actual situation of magnetic levitation lines built and running all over the world, high speed magnetic levitation trains have extremely high requirements for track beams, an elastic error of the track beams must be controlled within ±2 millimeters (mm), an error of a stator surface is required to be within 0.1 mm, based on the three evenly distributed tracks and a levitation height of superconducting magnetic levitation reaching 10 mm or more, the elastic error of the track beams can be magnified several times, and the error of the stator surface can also be magnified several times, which greatly reduces manufacturing, installation costs, and maintenance difficulties.

BRIEF DESCRIPTION OF DRAWINGS

The disclosure is described with a help of the following drawings.

LIST OF REFERENCE NUMBERS

11—inner pipeline; 12—outer pipeline;
2—train;
21—first moving track; 22—second moving track; 23—third moving track; 24—first head; 25—loading part; 26—second head; 27—electromagnetic damper; 28—convex part; 29—track block;
31—first fixed track; 32—second fixed track; 33—third fixed track; 34—through groove;
4—moving and fixed track coupling part;
5—connection unit; 51—platform;
6—starting covered bridge; 61—first walking board;
71—first covered bridge part; 72—second covered bridge part; 73—second walking board; 74—first hydraulic cylinder; 75—second hydraulic cylinder;
81—third covered bridge part; 82—fourth covered bridge part; 83—third walking board; 84—third hydraulic cylinder; 85—fourth hydraulic cylinder; 86—superconductor; 87—permanent magnet;

88—circular installation position; 89—fourth walking board;
90—door; 91—connection covered bridge; 99—site;
10—corrugated telescopic sleeve.

DETAILED DESCRIPTION OF EMBODIMENTS

Figure 1:
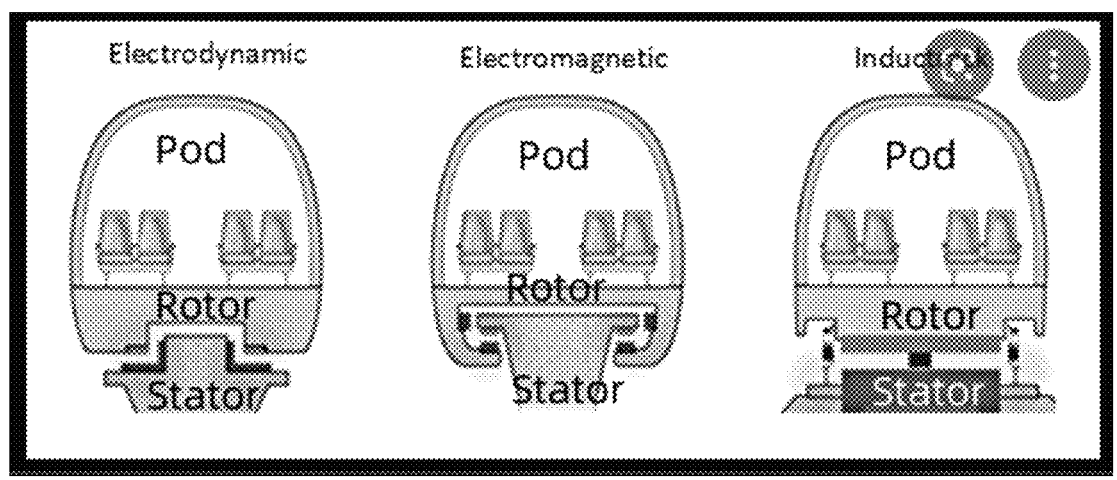
FIG. 1 illustrates a schematic structural diagram of train bottom magnetic levitation above a track in the related art.

In order to better describe the disclosure and facilitate understanding, the disclosure will be described in detail in conjunction with drawings and embodiment. It should be noted that terms "up", "down", "left" and "right" recorded in the disclosure refer to orientations in FIG. 1 and FIG. 10.

Embodiment 1

Figure 2A:
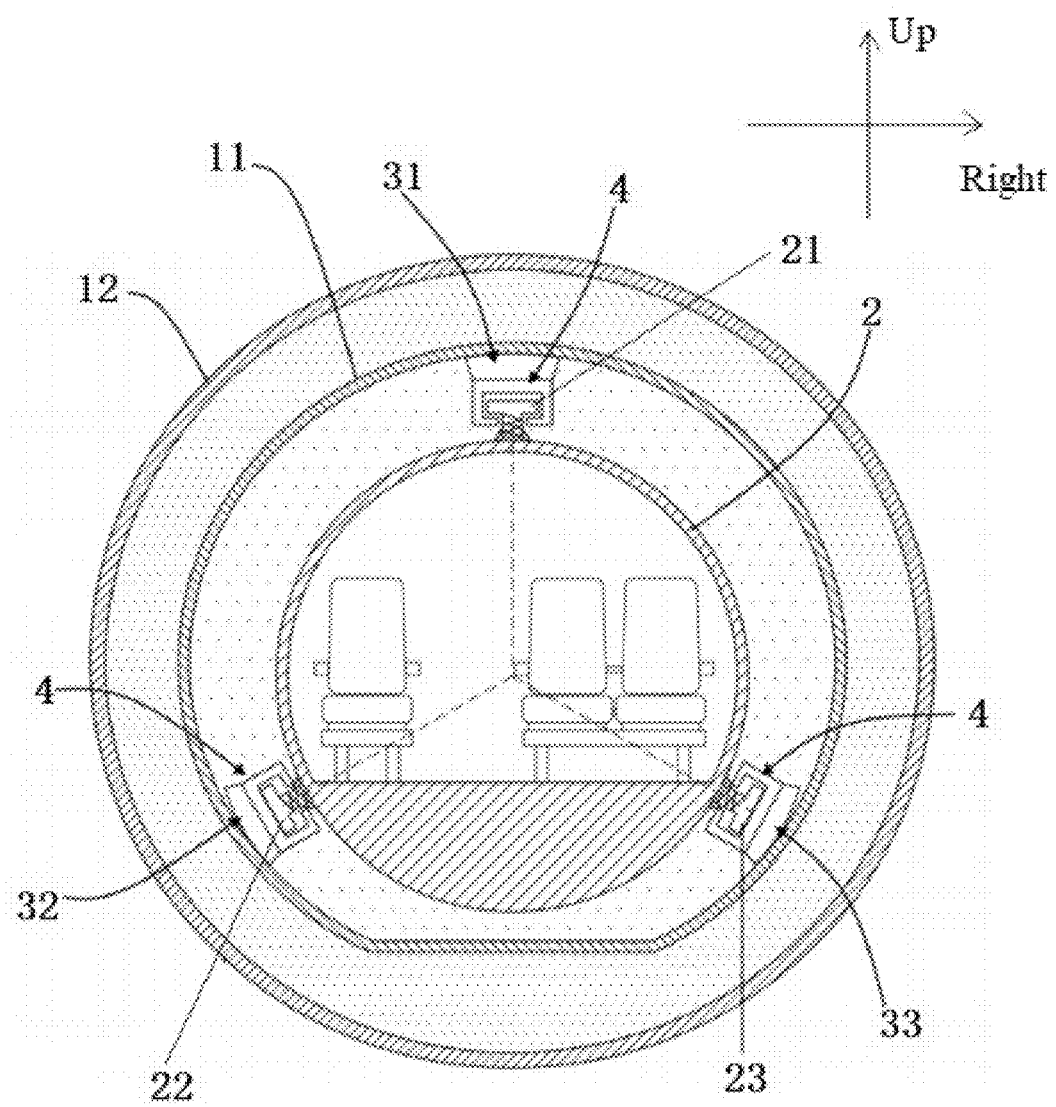
FIG. 2a illustrates a sectional schematic diagram of a vacuum pipeline magnetic levitation conveying device in a first direction according to an embodiment 1 of the disclosure.
Figure 2B:
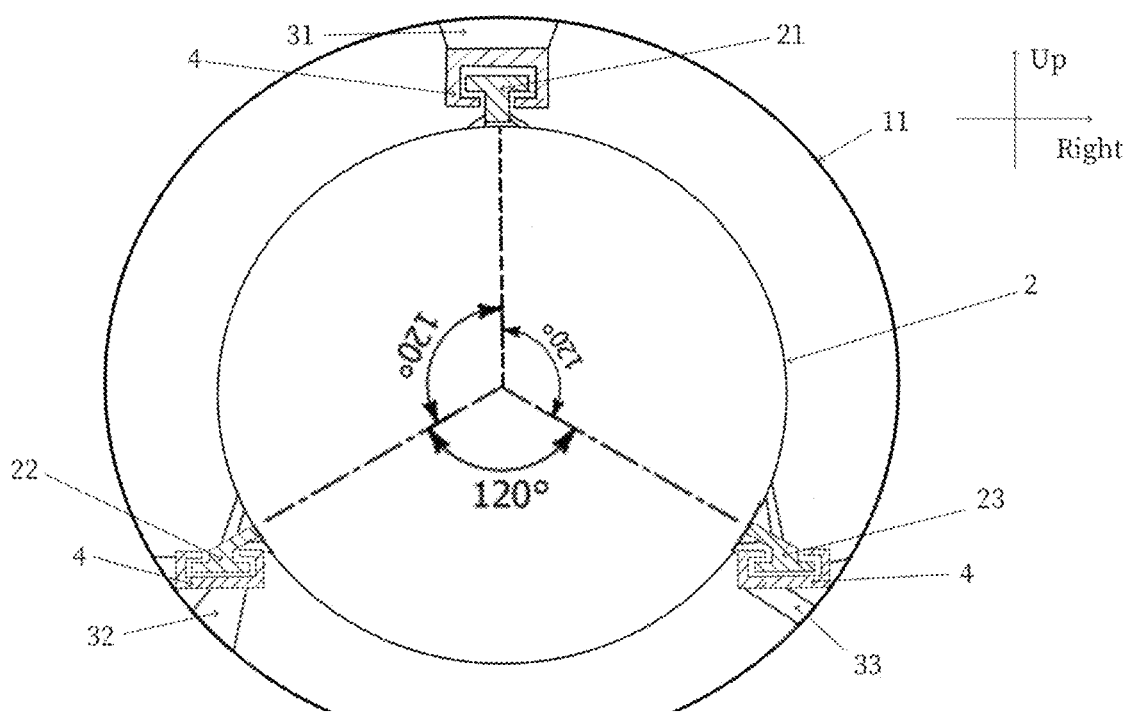
FIG. 2b illustrates a sectional schematic diagram of a vacuum pipeline magnetic levitation conveying device in a second direction according to an embodiment 1 of the disclosure.
Figure 3:
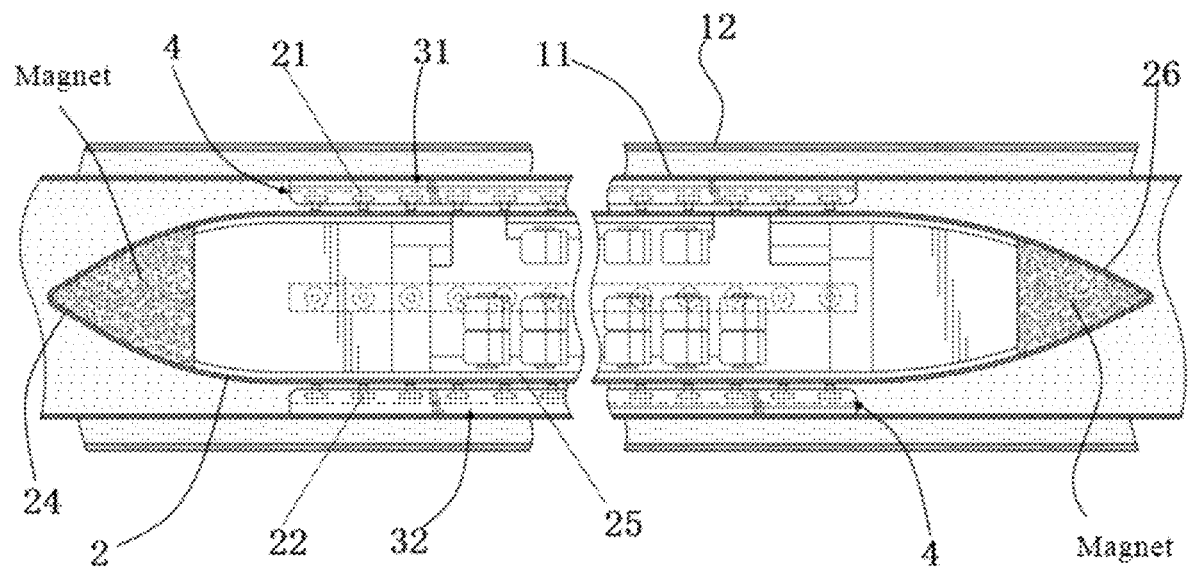
FIG. 3 illustrates a sectional schematic diagram of the vacuum pipeline magnetic levitation conveying device in a second direction according to the embodiment 1 of the disclosure, specifically, moving tracks are illustrated to be rotated 90 degrees (°) with respect to its actual direction of extension.

FIGS. 2a-2b illustrate sectional schematic diagrams of a vacuum pipeline magnetic levitation conveying device in a first direction according to the embodiment 1 of the disclosure, and FIG. 3 illustrates a sectional schematic diagram of the vacuum pipeline magnetic levitation conveying device in a second direction according to the embodiment 1 of the disclosure. As shown in FIGS. 2a-2b and FIG. 3, the vacuum pipeline magnetic levitation conveying device includes: a vacuum pipeline, a train 2, three fixed tracks and multiple sites 99. The sites 99 are sequentially connected through the vacuum pipeline. The three fixed tracks are disposed in the vacuum pipeline and each extend along an extension direction of the vacuum pipeline, the three fixed tracks are parallel to each other, the three fixed tracks together define a circumscribed circle, and the three fixed tracks are evenly distributed on the circumscribed circle (i.e., the three fixed tracks are evenly distributed at intervals of 120° along a circumference of the circumscribed circle). The train 2 is disposed in the vacuum pipeline, a body of the train 2 is provided with three moving tracks evenly distributed around the train 2, the moving tracks correspond to the fixed tracks one by one, and the moving tracks are coupled to the fixed tracks in a magnetic levitation manner.

Each moving track is coupled to the corresponding fixed track in the magnetic levitation manner to form a moving and fixed track coupling part 4, to thereby provide a magnetic levitation force and a propulsion force to drive the train 2 to run along the tracks. Specifically, the moving tracks are respectively coupled to the fixed tracks through a magnetic levitation technology, so that there is no mechanical contact between the moving tracks and the fixed tracks during use, and the propulsion force of the train 2 is obtained through a suitable electromagnetic drive technology.

The vacuum pipeline magnetic levitation conveying device is disposed as the above and includes the moving and fixed track magnetic levitation coupling parts, which are evenly distributed at 120° from each other along the circumference. In a first aspect, the conveying device can provide driving force, support and guidance for the train 2, which can keep the train on the tracks more stably when the train 2 turns or goes up and down a ramp, and greatly improve a guidance function of the tracks and the vacuum pipeline on the train 2, thus reducing a turning radius of the train 2, the train 2 is always firmly confined between three tracks, when the train 2 runs, amplitudes of swinging from side to side and jumping up and down are very small, so the train body runs smoothly, has no tendency to roll over, never derails, and its safety is greatly improved, and a comfortable ride experience is provided to the passengers. In a second aspect, during the train 2 runs, the conveying device can better balance and disperse the pressure (e.g., impact force) from all sides, the enormous centrifugal force generated during the train 2 turns at a high speed or the enormous pressure generated during the train 2 goes up and down the ramp is shared by three moving and fixed track coupling parts 4, and is uniformly distributed around the circumference, so as to reduce up-and-down oscillation and left-and-right swing during the train 2 runs, reduce fatigue damage of parts such as the train 2, the tracks and the vacuum pipeline, and improve safety and stability of the train running. In a third aspect, an allowable value of the conveying device for track installation and manufacturing error is large, according to an actual situation of magnetic levitation lines built and running all over the world, high speed magnetic levitation trains have extremely high requirements for track beams, an elastic error of the track beams must be controlled within ±2 millimeters (mm), an error of a stator surface is required to be within 0.1 mm, based on the three evenly distributed tracks and a levitation height of superconducting magnetic levitation reaching 10 mm or more, the elastic error of the track beams can be magnified several times, and the error of the stator surface can also be magnified several times, which greatly reduces manufacturing, installation costs, and maintenance difficulties.

Figure 2C:
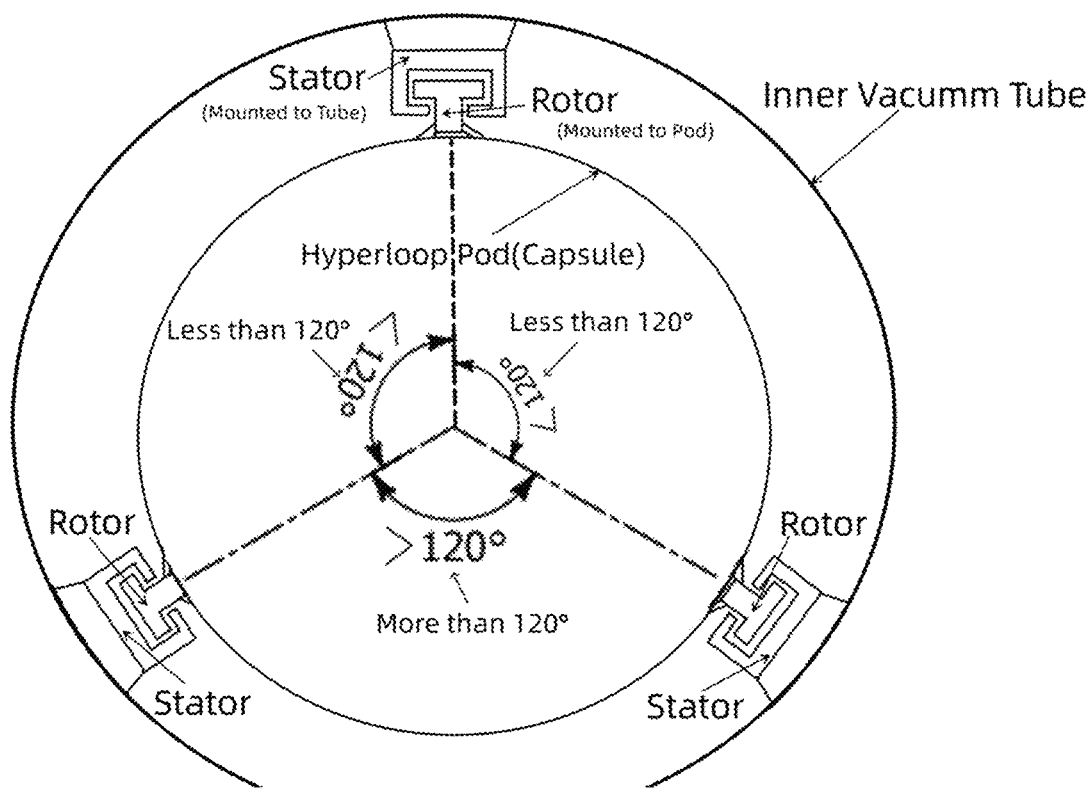
FIG. 2c illustrates a schematic diagram that an angle between second and third tracks is greater than 120 degrees (°) according to an embodiment 1 of the disclosure.
Figure 2D:
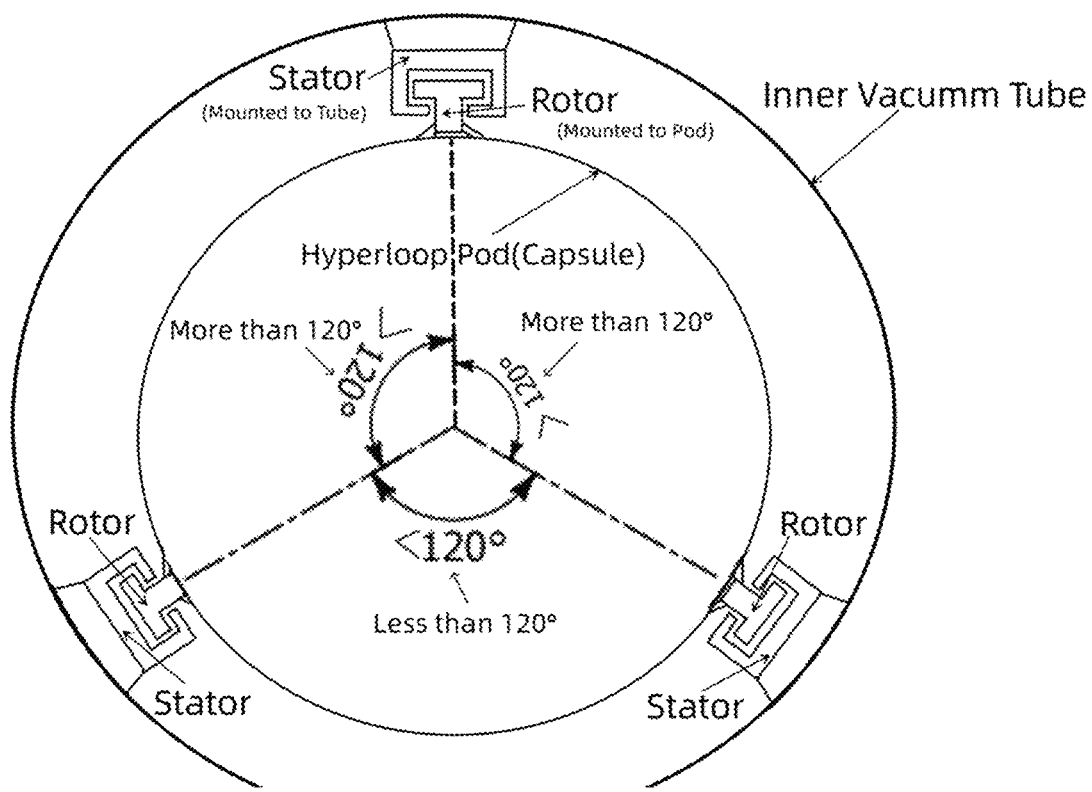
FIG. 2d illustrates a schematic diagram that the angle between the second and third tracks is less than 120° according to an embodiment 1 of the disclosure.

In some embodiments, the three fixed tracks are unevenly distributed on the circumscribed circle, that is, the three fixed tracks are not evenly distributed at 120°, and the angle between them may be greater than 120° or less than 120°. As shown in FIG. 2c and FIG. 2d, which can adapt to needs of some special situations and better adapt to needs of actual working conditions.

In an embodiment, the three fixed tracks are a first fixed track 31, a second fixed track 32 and a third fixed track 33, respectively. The first fixed track 31 is disposed on a top of the vacuum pipeline, and is located on a middle of the vacuum pipeline in a left-right direction. The second fixed track 32 and the third fixed track 33 are disposed on a bottom of the vacuum pipeline and are respectively located on two sides of the first fixed track 31. The three moving and fixed track coupling parts 4 are disposed in such direction, which can further improve a support and guidance function for the train 2.

In an alternative embodiment, in the three fixed tracks, the first fixed track 31 is disposed on the bottom of the vacuum pipeline, and is located on the middle of the vacuum pipeline in the left-right direction. The second fixed track 32 and the third fixed track 33 are disposed on the top of the vacuum pipeline and are respectively located on the two sides of the first fixed track 31. The three moving and fixed track coupling parts 4 are disposed in such direction, which can also improve the support and guidance function for the train 2.

In an embodiment, each moving track includes multiple track blocks 29 arranged at intervals in sequence along an extension direction of the train 2. The moving track is disposed as segmented track blocks, a change of a running direction of the train 2 leads to a change of pressure of the moving track on the fixed track, the moving track is block-shaped, and not a continuous track, thus the change of the pressure is gradually applied to components such as the fixed tracks and supporting pipelines, which can make the train 2 smoother when turning and going up and down a ramp, reduce detent force, and further reduce impact on the train 2, the tracks, and the vacuum pipelines when turning and going up and down the ramp.

In an embodiment, as shown in FIG. 3, each moving track includes multiple track blocks 29 arranged at intervals along the extension direction of the train 2, and the three moving tracks are a first moving track 21, a second moving track 22 and a third moving track 23, respectively. The first moving track 21 is coupled to the first fixed track 31 in the magnetic levitation manner, the second moving track 22 is coupled to the second fixed track 32 in the magnetic levitation manner, and the third moving track 23 is coupled to the third fixed track 33 in the magnetic levitation manner. In the first moving track 21, an interval between adjacent two track blocks 29 is in a range of 0.3-0.9 centimeters (cm), and a length of each track block 29 is in a range of 10-30 cm. In the second moving track 22, an interval between adjacent two track blocks 29 is in a range of 1.4-2.2 cm, and a length of each track block 29 is in a range of 10-30 cm. In the third moving track 23, an interval between adjacent two track blocks 29 is in a range of 1.4-2.2 cm, and a length of each track block 29 is in a range of 10-30 cm. The moving tracks are disposed in this way, which can make the train 2 smoother when turning and going up and down the ramp, and further reduce impact between the train 2 and the fixed tracks.

As an example, a length of the train 2 is 20 meters (m); in the first moving track 21, the interval between the adjacent two track blocks 29 is 0.6 cm, and the length of each track block 29 is 20 cm; in the second moving track 22, the interval between the adjacent two track blocks 29 is 1.8 cm, and the length of the track block 29 is 20 cm; and in the third moving track 23, the interval between the adjacent two track blocks 29 is 1.8 cm, and the length of the track block 29 is 20 cm.

In an embodiment, as shown in FIG. 3, the train 2 includes: a first head 24, a loading part 25 and a second head 26 connected sequentially, the first head 24 and the second head 26 are both in a streamlined cone shape, the loading part 25 is in a cylindrical shape, and the loading part 25 is provided with passenger seats therein. Thus, air resistance during running of the train 2 is further reduced, and a requirement of bidirectional driving is satisfied.

Figure 4:
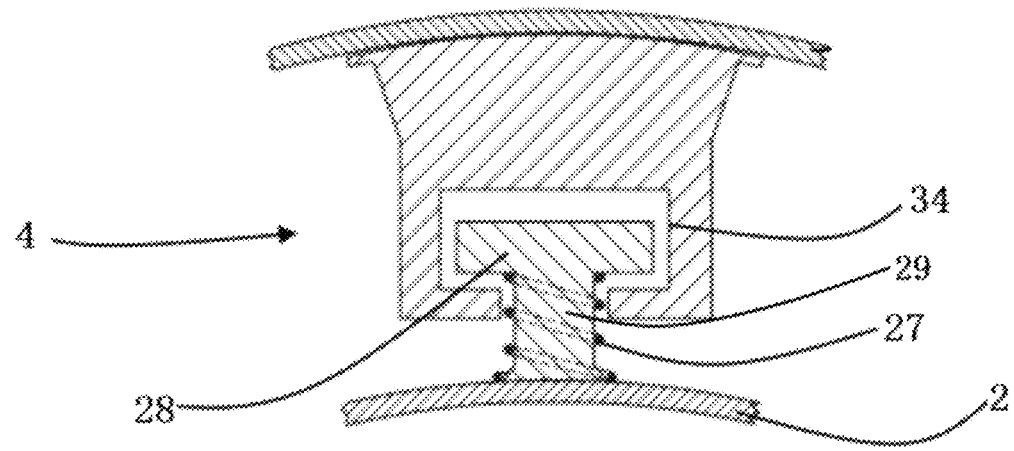
FIG. 4 illustrates a schematic structural diagram of a first moving and fixed track coupling part according to the embodiment 1 of the disclosure.
Figure 5:
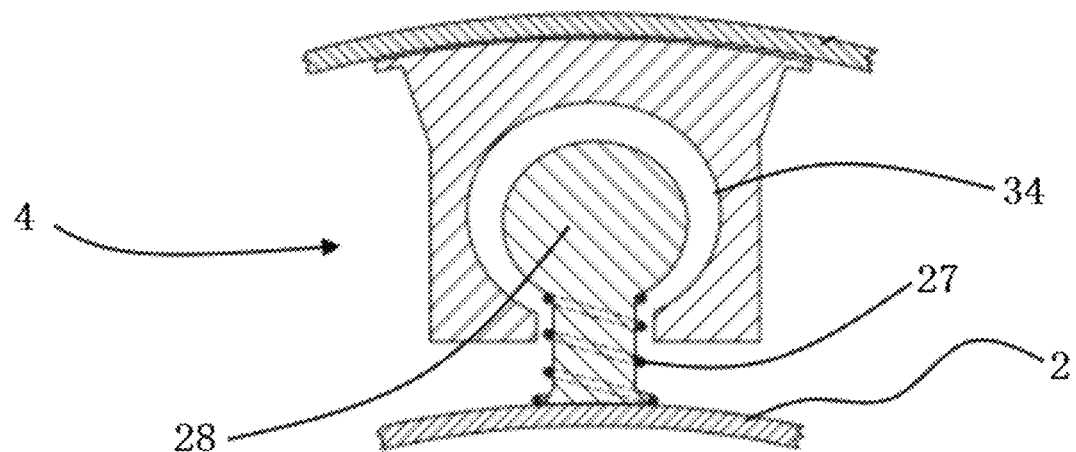
FIG. 5 illustrates a schematic structural diagram of a second moving and fixed track coupling part according to the embodiment 1 of the disclosure.
Figure 6:
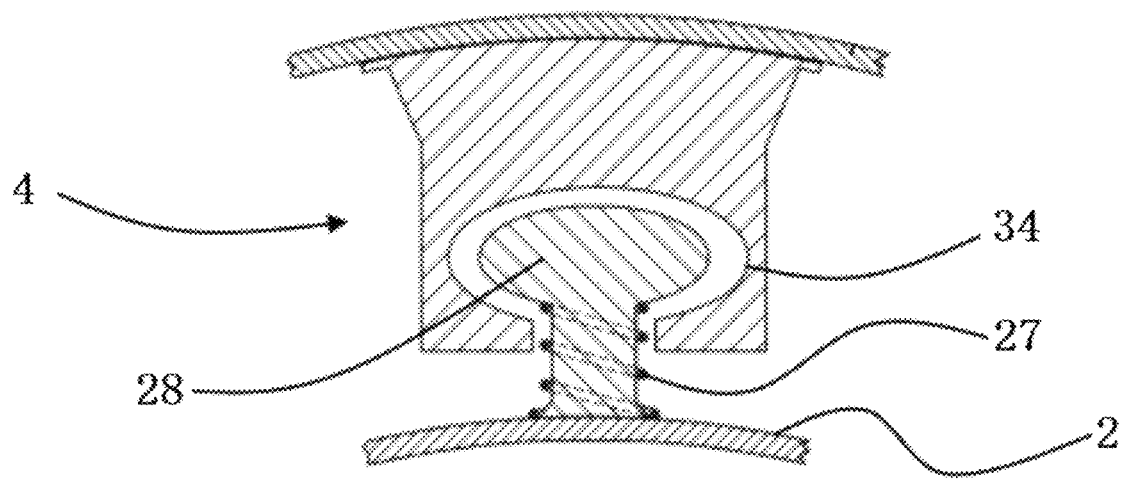
FIG. 6 illustrates a schematic structural diagram of a third moving and fixed track coupling part according to the embodiment 1 of the disclosure.

In an embodiment, as shown in FIGS. 4-6, the moving and fixed track coupling part 4 includes a mechanical damper, a pneumatic damper, a hydraulic damper, and/or an electromagnetic damper 27 for adsorbing or reducing vibration and impact between the train 2 and the fixed track. Thus, vibration and impact in all directions perpendicular to the running direction of the train 2 are reduced, comfort and stability of the train 2 are improved, and service life of the components of the train 2 is extended.

In an embodiment, each moving track includes: a convex part 28, each fixed track defines a through groove 34 with an opening facing towards the convex part 28, the convex part 28 is matched with and engaged in the through groove 34 to form the moving and fixed track coupling part 4, and a high-speed relative movement can be achieved between the convex part 28 and the through groove 34 during running of the train 2 in the vacuum pipeline.

In an embodiment, the moving and fixed track coupling part 4 has a mechanical ball-and-socket structure, and the ball-and-socket structure can be selected in different shapes as required. For example, the convex part 28 of the moving track can be rectangular, circular, elliptical, gradually deformed, hyperbolic, parabolic or cycloidal (see FIGS. 4-6), so as to reduce impact pressure. The corresponding through groove 34 of the fixed track has a corresponding shape to receive and connect the corresponding part of the moving track.

In an embodiment, as shown in FIG. 3, the first head 24 and the second head 26 of the train 2 are provided with magnets. A first train and a second train are arranged adjacent to each other in the running direction of the train 2, a second head of the first train is adjacent to a first head of the second train, and the magnet of the second head of the first train and the magnet of the first head of the second train repel each other. Thus, unexpected collision and interference between the trains can be avoid. Similarly, a stopping device of the train 2 disposed in the sites 99 can also include magnets with similar repulsion, to thereby minimize unexpected collision and interference or other interference between the vacuum pipeline or the tracks and the train 2.

In an embodiment, as shown in FIGS. 2a-2b, the vacuum pipeline includes: an inner pipeline 11 and an outer pipeline 12 sleeved outside the inner pipeline 11, the train 2 and the fixed tracks are disposed in the inner pipeline 11, an inner space of the inner pipeline 11 is evacuated to one thousandth to zero point one thousandths (i.e., 1 thousandth (1%)-0.1%) of a standard atmospheric pressure, and a space between the inner pipeline 11 and the outer pipeline 12 is evacuated to one percent to four percent (i.e., 1%-4%) of the standard atmospheric pressure. It is easy to evacuate the space between the inner pipeline 11 and the outer pipeline 12 to one percent to four percent of the standard atmospheric pressure, and it is difficult to evacuate the inner space of the inner pipeline 11 to one thousandth to zero point one thousandths of the standard atmospheric pressure. The vacuum pipeline is disposed as inner and outer double-layer pipelines, and the space between the inner pipeline 11 and the outer pipeline 12 is evacuated to one percent to four percent of the standard atmospheric pressure, thus, it is easy to evacuate the inner space of the inner pipeline 11 to one thousandth to zero point one thousandths of the standard atmospheric pressure, and it is beneficial for maintaining the pressure in the inner space of the inner pipeline 11 at one thousandth to zero point one thousandths of the standard atmospheric pressure. Furthermore, the pressure in the inner space of the inner pipeline 11 is maintained at one thousandth to zero point one thousandths of the standard atmospheric pressure, to thereby minimize aerodynamic resistance of the train 2 running inside the vacuum pipeline, and further improve the speed of the train 2.

With help of the moving and fixed track coupling parts 4 evenly distributed at intervals of 120° along the circumference, the moving tracks arranged by segmented track blocks 29, and the vacuum pipelines arranged by inner and outer double-layer pipelines, the vacuum pipeline magnetic levitation conveying device provided in the embodiment achieves a great increase in the speed of the train 2, which can reach 1000-20000 kilometers per hour (km/h). In addition, with the help of the moving and fixed track coupling parts evenly distributed at intervals of 120° along the circumference, and the moving tracks arranged by segmented track blocks 29, the vacuum pipeline magnetic levitation conveying device provided in the embodiment can greatly reduce a turning radius of the train 2 at high speed (1000-20000 km/h). Through computational and computer simulations, the turning radius of the train 2 at the high speed can be reduced from more than 1000 kilometers (km) to 10-100 km. Furthermore, with the help of the moving and fixed track coupling parts evenly distributed at intervals of 120° along the circumference, the tracks have a very stable and accurate guiding effect on the train 2. The train 2 is always firmly confined between three tracks, when the train runs, the amplitudes of swinging from side to side and jumping up and down are very small, so the train body runs smoothly, has no tendency to roll over, never derails, and its safety is greatly improved. The guidance of the magnetic levitation train is a crucial question during a high-speed running at speeds exceeding thousands of kilometers per hour or more. The magnetic levitation train does not have a same wheel guidance mechanism as an ordinary wheel track railway, a traditional vacuum pipeline magnetic levitation train needs to set an additional side guide mechanism, which increases complexity of structure and manufacturing maintenance costs, and the effect is not good, with certain drawbacks. The disclosure overcomes the above drawbacks better.

It should be noted that the vacuum pipeline magnetic levitation conveying device further includes: an electromagnetic drive unit for controlling the train 2 to travel along the fixed tracks. The electromagnetic drive unit is disposed inside the fixed tracks to drive the train 2 to accelerate or decelerate.

The embodiment utilizes a driving principle of electromagnetic track ejection to accelerate or decelerate the train 2. Specifically, an interior of each fixed track is provided with an electromagnetic field, correspondingly, the moving track of the train 2 is provided with an electromagnetic field interacting with the fixed track, the train 2 is driven to accelerate or decelerate as a whole through controlling the electromagnetic field generated by the fixed tracks to act on the moving tracks of the train 2. Furthermore, a direction of a driving force is changed through changing directions of magnetic poles in the electromagnetic field, and a size of the driving force is changed through controlling a size of magnetic flux in the electromagnetic field. The electromagnetic drive unit includes multiple electromagnetic fields disposed on the fixed tracks, specifically, the electromagnetic fields can be flexibly distributed at a starting point, a middle point, and an ending point of the train 2 on the fixed tracks as needed, the train 2 can be steadily driven forward by electromagnetic force when the electromagnetic field is disposed on the starting point of the train 2, when the train 2 approaches the ending point, the electromagnetic field at the ending point carries out reverse braking and deceleration, so that the train 2 stops smoothly.

In an embodiment, as an example, an electromagnetic acceleration distance of the starting of the train 2 in the fixed tracks is in a range of 5-50 km, and an electromagnetic acceleration distance of the ending point of the train 2 in the fixed tracks is in a range of 10-100 km. Thus, the vibration of the train 2 and the inertial impact on the passengers during the acceleration or deceleration of the train 2 are reduced, and ride comfort of the passengers is enhanced.

In order to keep the running speed of the train 2 in a steady state, the electromagnetic fields are arranged at any required position where the train 2 runs on the fixed tracks, which can drive the train 2 to always run at a preset speed.

In an embodiment, the convex part 28 of the moving track is provided with a superconductor 86, the through groove 34 of the fixed track is provided with a permanent magnet 87, and an interaction between the superconductor 86 and the permanent magnet 87 makes the moving track be coupled to the fixed track. Thus, upper buoyancy, guiding force and propulsion force are provided to the train 2 through the interaction between the superconductor and the permanent magnet 87, the superconductor 86 produces a force called "pinning force" in the electromagnetic field, and the pinning force is a synthesis of force that various impurities in the hard superconductor pin a vortex line, when the train 2 runs in the tracks at the high speed, regardless of a reason why the train 2 deviates from the tracks or a trend of deviating from the tracks, the strong pinning force will pull it back, and the pinning force is like glue with extremely high viscosity, which firmly "binds" the fixed tracks that is not in contact with the train 2.

Compared to a normal conducting magnetic levitation technology, a super conducting magnetic levitation transportation system has integrated functions of traction, levitation, and guidance, with low energy consumption, light weight, fast speed, and low noise during running. A normal conducting magnetic levitation train will generate magnetic interference or magnetic resistance during running, which reduces an energy utilization rate, and generates a certain amount of heat. A current generated by the super conducting magnetic levitation train of the disclosure can continue to flow without energy loss, thereby reducing energy consumption, and generating less heat. The super conducting magnetic levitation train can generate a stronger electromagnetic field at lower energy consumption, thereby providing stronger propulsion force, allowing the train to run at a higher speed, and reducing running costs.

For convenience of understanding, a propulsion principle of the vacuum pipeline magnetic levitation conveying device is described below.

Figure 7:
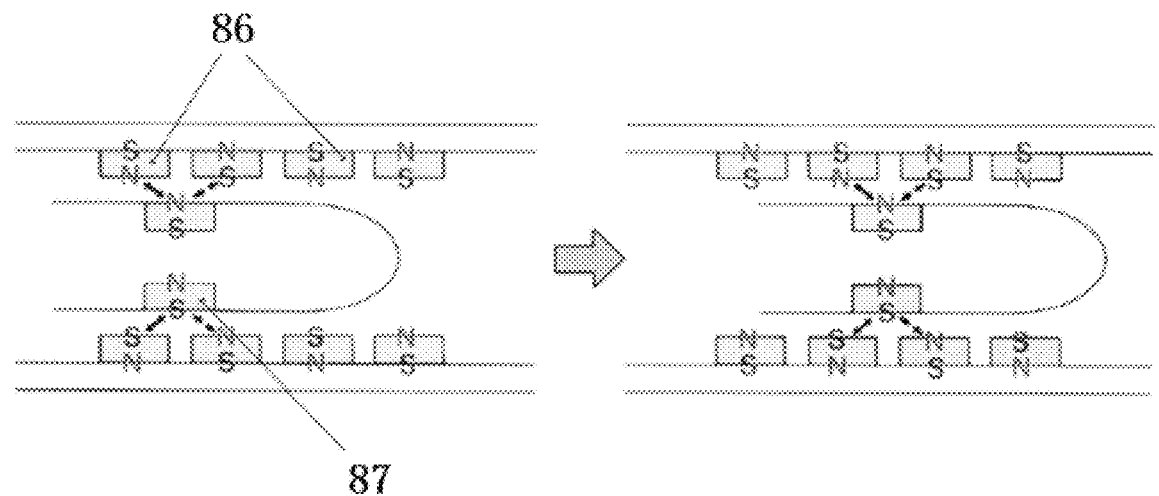
FIG. 7 illustrates a schematic diagram of a driving principle of a vacuum pipeline magnetic levitation train according to the embodiment 1 of the disclosure.

As shown in FIG. 7, a drive of the train 2 in the vacuum pipeline adopts a principle of a linear synchronous motor, the train body is provided with short rotors, both sides of the tracks are provided with long stators, the long stators include multiple windings to form magnetic pole pairs, alternating current (AC) with frequency modulation and amplitude modulation is introduced to generate an electromagnetic force to draw the train 2 forward. Specifically, a north (N) pole of an electromagnet at the head of the train 2 is attracted by a south (S) pole of an electromagnet installed on the track closer to the front, while being repelled by a N pole of an electromagnet installed later on the track, and pulling forward and pushing backward. If a position of the N pole at the head of the train 2 exceeds an original S pole on the track, a direction of AC flowing in the track coil is just the opposite, that is, the original S pole is changed to a N pole to generate a propulsion force, and an original N pole is changed to the S pole to generate an attraction force. This repetitive forward force relies on a substation next to the track, which coordinates a stator current frequency and voltage with the speed of the train 2. Simply put, the substation adjusts a traveling wave magnetic field of the stator and pulls the rotor to move in a straight line. Similarly, the traveling wave magnetic field of the stator is supplied in segments.

A braking principle and the propulsion principle of the vacuum pipeline train 2 are the same, when the train 2 needs to decelerate, reverse AC is introduced to the stator coil, and a reverse magnetic field in the stator will generate a braking force for the train 2, causing the train 2 to decelerate. In addition, if the power supply to the stator is stopped, the deceleration effect can still be achieved.

A traction mode of the linear synchronous motor in the embodiment is basically the same as that of a traction mode of a normally conducting linear motor, and the only difference is that the rotor of the super conducting linear motor generates a constant magnetic field with superconducting current, while the normally conducting linear motor generates a constant magnetic field with battery power supply.

Embodiment 2

Main differences between the embodiment and the embodiment 1 are as follows.

Figure 8:
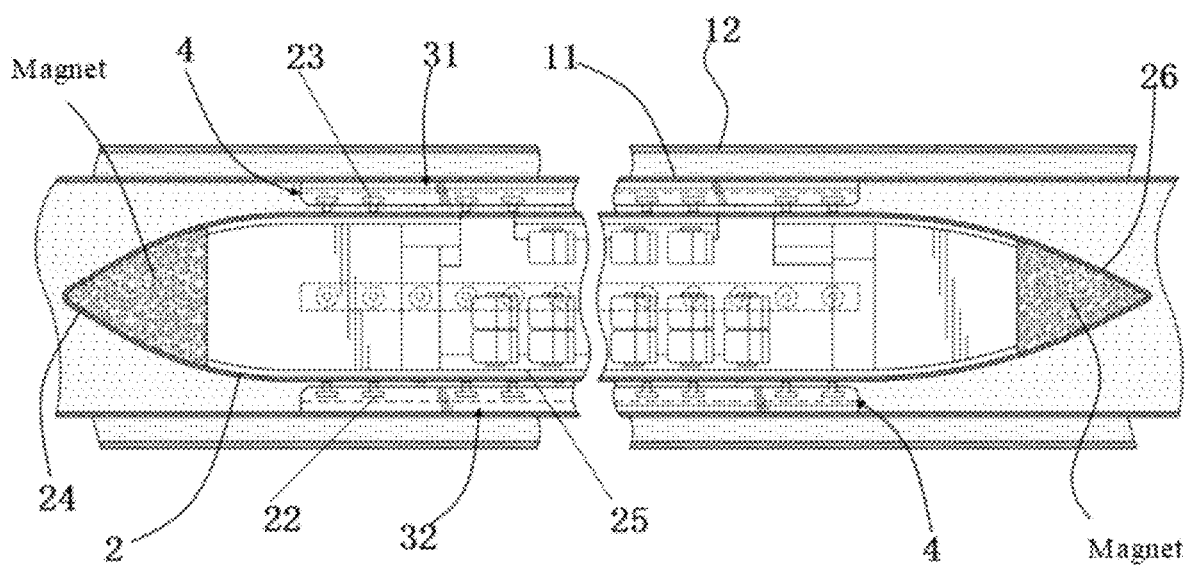
FIG. 8 illustrates a sectional schematic diagram of a vacuum pipeline magnetic levitation conveying device in a second direction according to an embodiment 2 of the disclosure, specifically, moving tracks are illustrated to be rotated 90° with respect to its actual direction of extension.

As shown in FIG. 8, each moving track includes multiple track groups arranged at intervals along the extension direction of the train 2, and each track group includes multiple track blocks 29 arranged at intervals along the extension direction of the train 2. In the first moving track, an interval between adjacent two track groups is in a range of 20-120 cm, in each track group of the first moving track, an interval between adjacent two track blocks 29 is in a range of 0.3-0.9 cm, and a length of each track block 29 is in a range of 10-30 cm. In the second moving track, an interval between adjacent two track groups is in a range of 20-120 cm, in each track group of the second moving track, an interval between adjacent two track blocks 29 is in a range of 1.4-2.2 cm, and a length of each track block 29 is in a range of 10-30 cm. In the third moving track, an interval between adjacent two track groups is in a range of 20-120 cm, in each track group of the third moving track, an interval between adjacent two track blocks 29 is in a range of 1.4-2.2 cm, and a length of each track block 29 is in a range of 10-30 cm.

As an example, the length of the train is 20 m, and each moving track includes three track groups arranged at intervals along the extension direction of the train 2. In the first moving track, the interval between the adjacent two track groups is 100 cm, in each track group of the first moving track, the interval between adjacent two track blocks 29 is 0.6 cm, and the length of each track block 29 is 20 cm. In the second moving track, the interval between adjacent two track groups is 100 cm, in each track group of the second moving track, the interval between adjacent two track blocks 29 is 1.8 cm, and the length of each track block 29 is 20 cm. In the third moving track, the interval between adjacent two track groups is 100 cm, in each track group of the third moving track, the interval between adjacent two track blocks 29 is 1.8 cm, and the length of each track block 29 is 20 cm.

Remaining parts are the same as those in the embodiment 1, and will not be described here.

Embodiment 3

On a basis of the vacuum pipeline magnetic levitation conveying device described in the embodiment 1, the vacuum pipeline magnetic levitation conveying device further includes: a connection unit 5, and vacuum environment is isolated through the connection unit 5 after the train arrive at the station to form a get-on and get-off passage for the passengers to get on and off the train.

Figure 9:
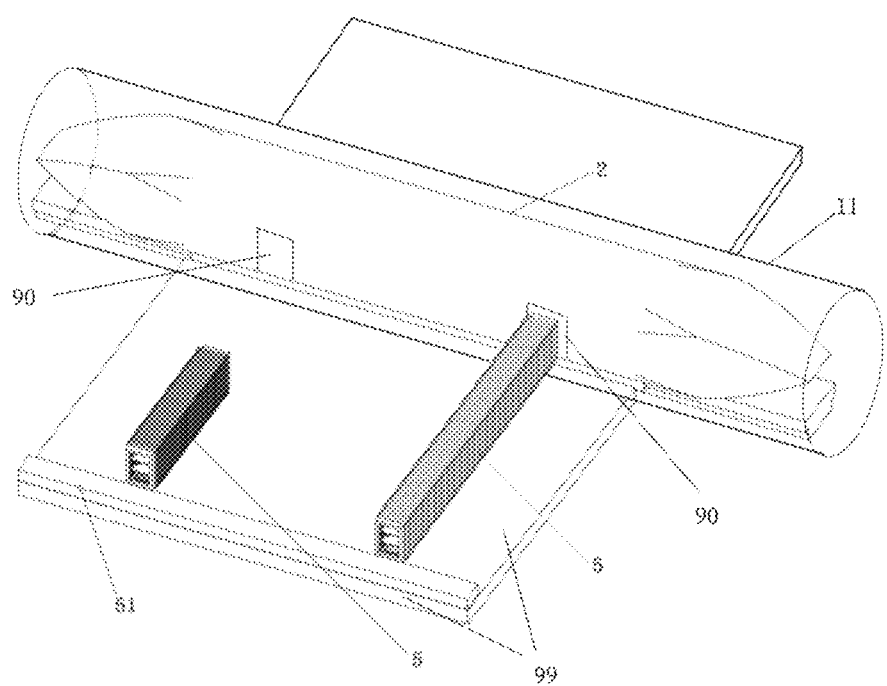
FIG. 9 illustrates a schematic structural diagram of a cooperation between a connection unit and a train according to an embodiment 3 of the disclosure.
Figure 10:
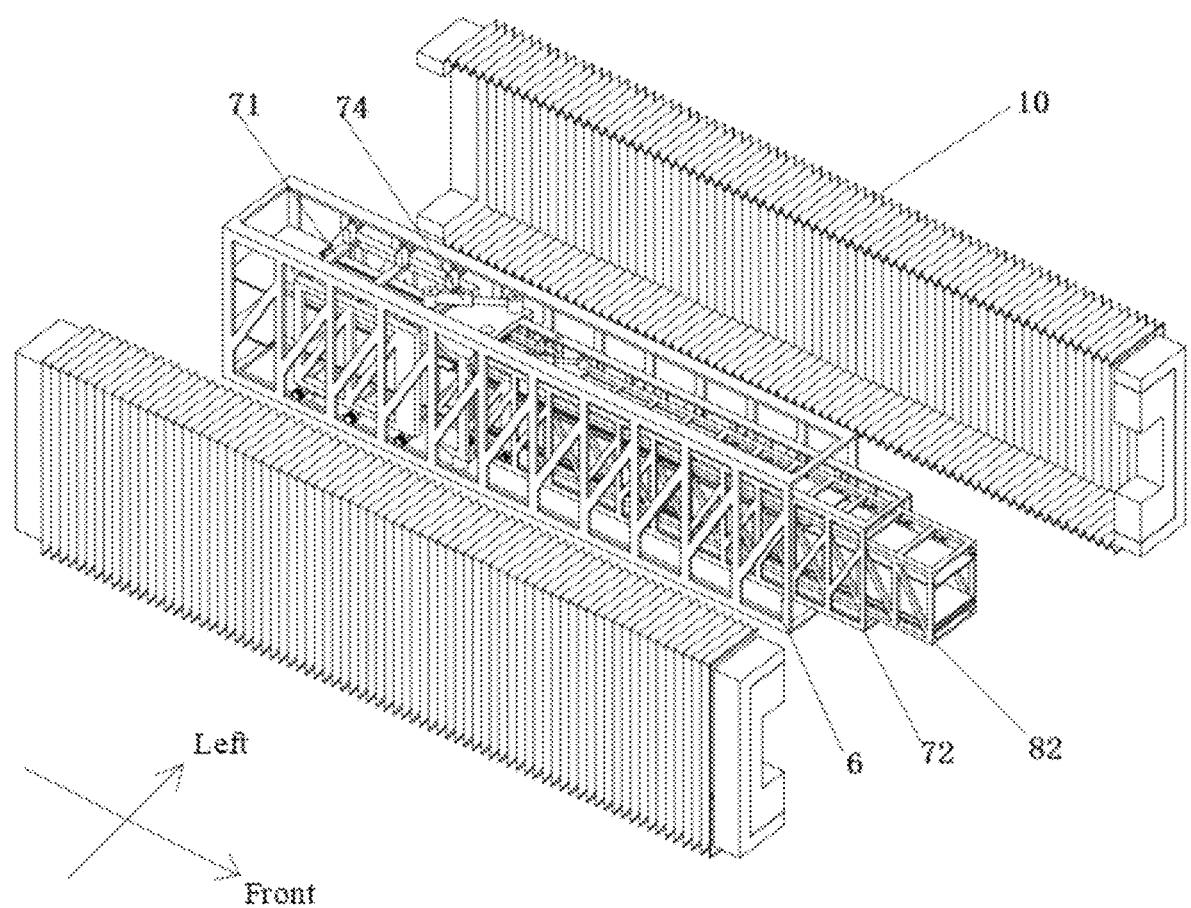
FIG. 10 illustrates a breakdown structural schematic diagram of the connection unit in a drawn back state according to the embodiment 3 of the disclosure.

The connection unit 5 is described in detail below according to FIGS. 9-11. The connection unit 5 includes a platform 51, a starting covered bridge 6, a first straightened covered bridge, a second straightened covered bridge, a connection covered bridge 91, a first drive assembly, a second drive assembly, a third drive assembly, a fourth drive assembly, a fifth drive assembly and a corrugated telescopic sleeve 10. A first end of the starting covered bridge 6 is fixedly connected on the platform 51, a second end of the starting covered bridge 6 is disposed facing towards a door 90 of the train 2, and the starting covered bridge 6 is provided with a first walking board 61 therein for the passengers to get on and off. The first straightened covered bridge is telescopically supported in the starting covered bridge 6, a first end of the first straightened covered bridge corresponds to the first end of the starting covered bridge 6, and a second end of the first straightened covered bridge corresponds to the second end of the starting covered bridge 6. The first straightened covered bridge includes: a first covered bridge part 71 and a second covered bridge part 72, and the first covered bridge part 71 and the second covered bridge part 72 are sequentially arranged along a telescopic direction. The second covered bridge part 72 is provided with a second walking board 73 therein for the passengers to get on and off, the second walking board 73 is superposed on the first walking board 61, and the second walking board 73 is linearly and slidably connected to the first walking board 61 along the telescopic direction. An installation end of the first drive assembly is installed on the starting covered bridge 61, a moving end of the first drive assembly is installed on the first covered bridge part 71; and an installation end of the second drive assembly is installed on the first covered bridge part 71, a moving end of the second drive assembly is installed on the second covered bridge part 72. The first drive assembly is configured to drive the first straightened covered bridge to move linearly along the telescopic direction, to thereby make the second walking board 73 to move to a first swinging position relative to the first walking board 61; and in the first swinging position, the second covered bridge part 72 completely extends out of the starting covered bridge 6, and the second drive assembly is configured to drive the second covered bridge part 72 to swing horizontally relative to the first covered bridge part 71. The second straightened covered bridge is telescopically supported in the second covered bridge part 72, a first end of the second straightened covered bridge corresponds to the first end of the first straightened covered bridge, and a second end of the second straightened covered bridge corresponds to the second end of the first straightened covered bridge. The second straightened covered bridge includes: a third covered bridge part 81 and a fourth covered bridge part 82, and the third covered bridge part 81 and the fourth covered bridge part 82 are sequentially arranged along the telescopic direction. The fourth covered bridge part 82 is provided with a third walking board 83 therein for the passengers to get on and off, the third walking board 83 is superposed on the second walking board 73, and the third walking board 83 is linearly and slidably connected to the second walking board 73 along the telescopic direction. An installation end of the third drive assembly is installed on the second covered bridge part 72, a moving end of the third drive assembly is installed on the third covered bridge part 81; and an installation end of the fourth drive assembly is installed on the third covered bridge part 81, and a moving part of the fourth drive assembly is installed on the fourth covered bridge part 82. The third drive assembly is configured to drive the second straightened covered bridge to move linearly along the telescopic direction, to thereby make the third walking board 83 to move to a second swinging position relative to the second walking board 73; and in the second swinging position, the fourth covered bridge part 82 completely extends out of the second covered bridge part 72, and the fourth drive assembly is configured to drive the fourth covered bridge part 82 to swing horizontally relative to the third covered bridge part 81. The connection covered bridge 91 is telescopically supported in the fourth covered bridge part 82, a first end of the connection covered bridge 91 corresponds to a first end of the fourth covered bridge part 82, and a second end of the connection covered bridge 91 corresponds to a second end of the fourth covered bridge part 82. The fourth covered bridge part 82 is provided with a fourth walking board 89 therein for the passengers to get on and off, the fourth walking board 89 is superposed on the third walking board 83, and the fourth walking board 89 is linearly and slidably connected to the third walking board 83 along the telescopic direction. An installation end of the fifth drive assembly is installed on the fourth covered bridge part 82, a moving end of the fifth drive assembly is installed on the connection covered bridge 91. The fifth drive assembly is configured to drive the connection covered bridge 91 to move linearly along the telescopic direction, to thereby make the fourth walking board 89 to move to a connecting position relative to the third walking board 83; and in the connecting position, the second end of the connection covered bridge 91 is connected to the door 90 of the train 2. The second end of the connection covered bridge 91 are provided with a circular installation position 88, the circular installation position 88 is connected to the platform 51 through the corrugated telescopic sleeve 10, and the starting covered bridge 6, the first straightened covered bridge, the second straightened covered bridge and the connection covered bridge 91 are accommodated in the corrugated telescopic sleeve 10.

The connection unit 5 is disposed in this way, at the beginning, the first straightened covered bridge is telescopically supported in the starting covered bridge 6, the second straightened covered bridge is telescopically supported in the first straightened covered bridge 6, and the connection covered bridge 91 is telescopically supported in the second straightened covered bridge 6, when the train stops at the station, a deflection angle of the first straightened covered bridge and a deflection angle of the second straightened covered bridge are calculated according to a deflection angle between the platform 51 and the door 90 of the train 2, the second drive assembly drives the second covered bridge part 72 to rotate horizontally in the first swing position according to the deflection angle of the first straightened covered bridge, the fourth drive assembly drives the fourth covered bridge part 82 to rotate horizontally in the second swing position according to the deflection angle of the second straightened covered bridge, until a telescopic direction of the connection covered bridge 91 is consistent with an orientation of the door 90 of the train 2, the fifth drive assembly drives the connection covered bridge 91 to slide to the connection position along the telescopic direction, and the connection covered bridge 91 is connected to the door 90 of the train 2 face to face at the connection position. Technical problem in the related art that a connection system cannot be properly sealed and connected to the door 90 of the train 2 caused by a deviation between the door 90 of the train 2 and the platform 51 after the train stops at the station is solved. An isolation between a passenger passage and the vacuum environment is achieved through the corrugated telescopic sleeve 10.

In an embodiment, the first drive assembly, the third drive assembly and the fifth drive assembly are ball screw transmission systems. In an embodiment, the second drive assembly and the fourth drive assembly are both hydraulic cylinders.

Figure 11:
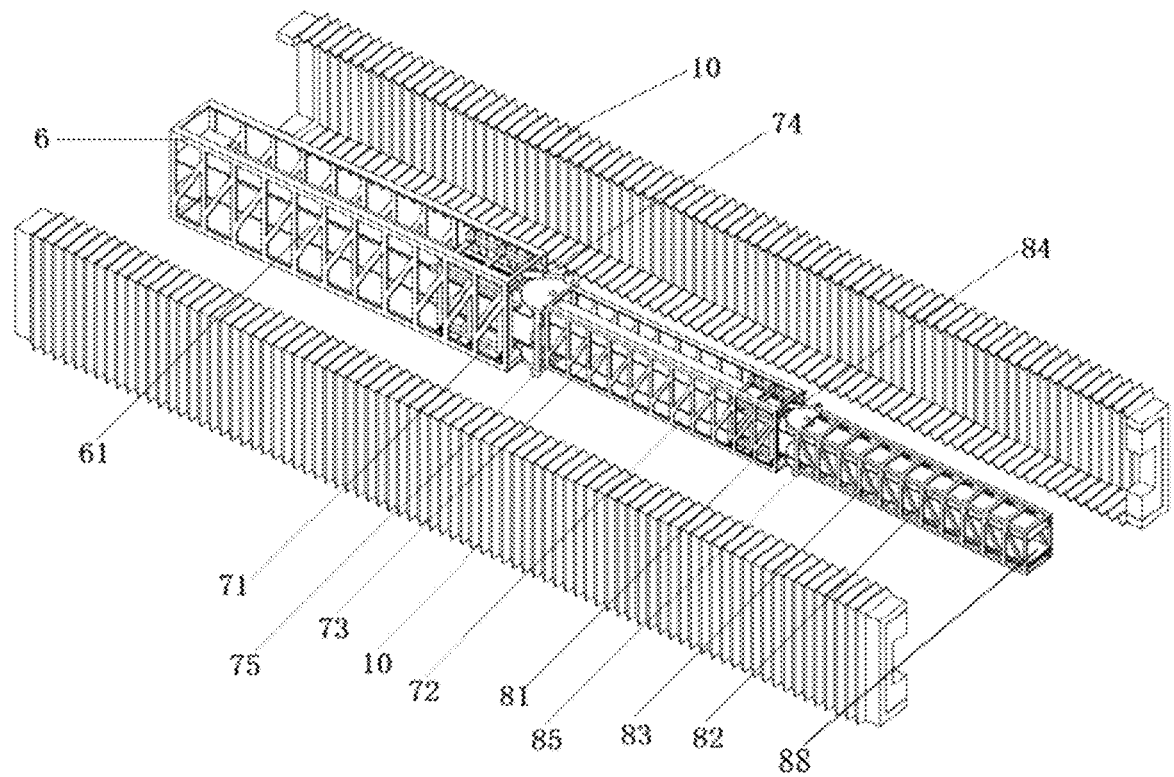
FIG. 11 illustrates a breakdown structural diagram of the connection unit in a stretched out state according to the embodiment 3 of the disclosure.
Figure 12:
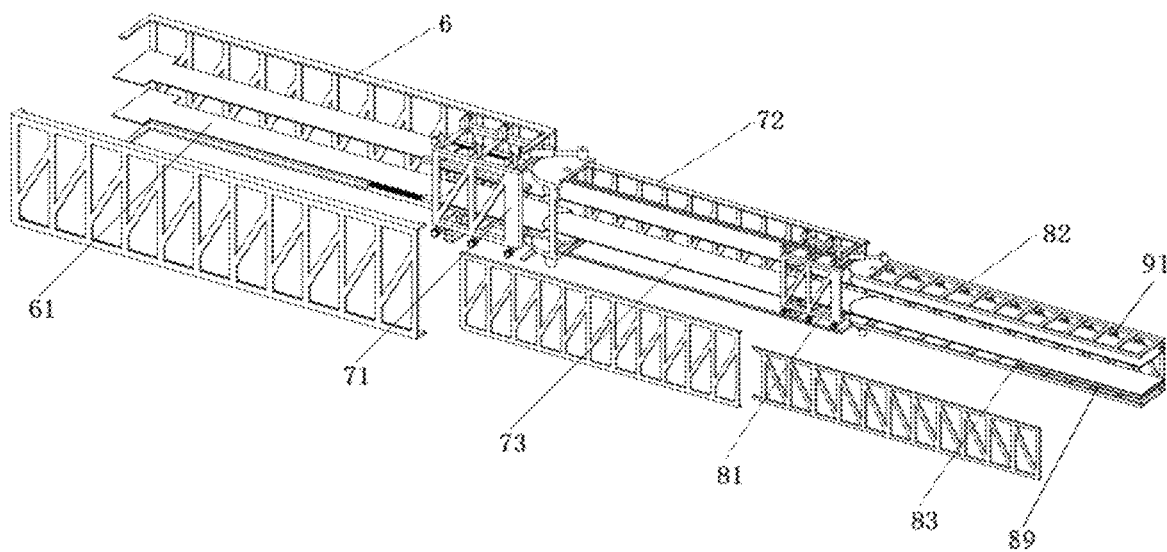
FIG. 12 illustrates a breakdown structural diagram of the connection unit according to the embodiment 3 of the disclosure.

In an embodiment, as shown in FIG. 11 and FIG. 12, the second drive assembly includes a first hydraulic cylinder 74 and a second hydraulic cylinder 75. An installation end of the first hydraulic cylinder 74 is hinged on a middle of the first covered bridge part 71 in a left-right direction, and a moving end of the first hydraulic cylinder 74 is hinged on a left side of the second covered bridge part 72. An installation end of the second hydraulic cylinder 75 is hinged on the middle of the first covered bridge part 71 in the left-right direction, and a moving end of the second hydraulic cylinder 75 is hinged on right side of the second covered bridge part 72. The fourth drive assembly includes a third hydraulic cylinder 84 and a fourth hydraulic cylinder 85. An installation end of the third hydraulic cylinder 84 is hinged on a middle of the third covered bridge part 81 in a left-right direction, and a moving end of the third hydraulic cylinder 84 is hinged on a left side of the fourth covered bridge part 82. An installation end of the fourth hydraulic cylinder 85 is hinged on the middle of the third covered bridge part 81 in the left-right direction, and a moving end of the fourth hydraulic cylinder 85 is hinged on a right side of the third covered bridge part 81. The second drive assembly is disposed in this way, and the second drive assembly drives the second covered bridge part 72 to horizontally swing relative to the first covered bridge part 71, to thereby accurately control a swing angle; and the fourth drive assembly is disposed in this way, and the fourth drive assembly drives the fourth covered bridge part 82 to horizontally swing relative to the third covered bridge part 71, to thereby accurately control the swing angle.

It should be understood that the above description of the embodiments of the disclosure is merely to illustrate technical routes and characteristics of the disclosure, and its purpose is to enable those skilled in the art to understand a content of the disclosure and implement it accordingly, but the disclosure is not limited to the above specific embodiments. All changes or modifications made within a scope of technical schemes of the disclosure should be covered by a protection scope of the disclosure.

What is claimed is:

1. A vacuum pipeline magnetic levitation conveying device, comprising:
a vacuum pipeline, a train, three fixed tracks and a plurality of sites; wherein the plurality of sites are sequentially connected through the vacuum pipeline; the three fixed tracks are parallel to each other and disposed in the vacuum pipeline, and the three fixed tracks each extend along an extension direction of the vacuum pipeline; the three fixed tracks together define a circumscribed circle, and the three fixed tracks are evenly distributed at an angle of 120° from each other on the circumscribed circle;
the train is disposed in the vacuum pipeline, a body of the train is provided with three moving tracks, the three moving tracks are parallel to each other and evenly distributed around the train; and the three moving tracks correspond to the three fixed tracks one by one, and the three moving tracks are respectively coupled to the three fixed tracks in a magnetic levitation manner;
wherein each of the three moving track comprises: a convex part, each of the three fixed track defines a through groove with an opening facing towards the convex part, the convex part is matched with and engaged in the through groove to form a moving and fixed track coupling part, and the moving and fixed track coupling part has a ball-and-socket structure; and
the convex part is provided with a superconductor, the through groove is provided with a permanent magnet therein, and an interaction between the superconductor and the permanent magnet makes the moving track be coupled with the fixed track in a magnetic levitation manner.

2. The vacuum pipeline magnetic levitation conveying device as claimed in claim 1, wherein the three fixed tracks are a first fixed track, a second fixed track and a third fixed track, respectively; and
wherein the first fixed track is disposed on a top of the vacuum pipeline and is located on a middle of the vacuum pipeline, and the second fixed track and the third fixed track are disposed on a bottom of the vacuum pipeline and are respectively located on two sides of the first fixed track; or wherein the first fixed track is disposed on a bottom of the vacuum pipeline and is located on a middle of the vacuum pipeline, and the second fixed track and the third fixed track are disposed on a top of the vacuum pipeline and are respectively located on two sides of the first fixed track.

3. The vacuum pipeline magnetic levitation conveying device as claimed in claim 2, wherein each of the three moving tracks comprises a plurality of track blocks arranged at intervals along an extension direction of the train.

4. The vacuum pipeline magnetic levitation conveying device as claimed in claim 3, wherein the three moving tracks are a first moving track, a second moving track and a third moving track, respectively; and the first moving track is coupled to the first fixed track in a magnetic levitation manner, the second moving track is coupled to the second fixed track in a magnetic levitation manner, and the third moving track is coupled with the third fixed track in a magnetic levitation manner; and in the first moving track, an interval between adjacent two track blocks of the plurality of track blocks is in a range of 0.3-0.9 cm, and a length of each of the plurality of track blocks is in a range of 10-30 cm; in the second moving track, an interval between adjacent two track blocks of the plurality of track blocks is in a range of 1.4-2.2 cm, and a length of each of the plurality of track blocks is in a range of 10-30 cm; and in the third moving track, an interval between adjacent two track blocks of the plurality of track blocks is in a range of 1.4-2.2 cm, and a length of each of the plurality of track blocks is in a range of 10-30 cm.

5. The vacuum pipeline magnetic levitation conveying device as claimed in claim 1, wherein the train comprises a first head, a loading part and a second head connected sequentially, the first head and the second head are both in a streamlined cone shape, the loading part is in a cylindrical shape, and the loading part is provided with passenger seats therein.

6. The vacuum pipeline magnetic levitation conveying device as claimed in claim 1, wherein the vacuum pipeline comprises: an inner pipeline and an outer pipeline sleeved outside the inner pipeline, the train and the three fixed tracks are disposed in the inner pipeline, an inner space of the inner pipeline is evacuated to 1 thousandth (1‰)-0.1%% of a standard atmospheric pressure, and a space between the inner pipeline and the outer pipeline is evacuated to 1%-4% of the standard atmospheric pressure.

7. The vacuum pipeline magnetic levitation conveying device as claimed in claim 1, wherein the vacuum pipeline magnetic levitation conveying device further comprises: a connection unit;

the connection unit comprises: a platform, a starting covered bridge, a first straightened covered bridge, a second straightened covered bridge, a first drive assembly, a second drive assembly, a third drive assembly, a fourth drive assembly and a corrugated telescopic sleeve;

a first end of the starting covered bridge is fixedly connected to the platform, a second end of the starting covered bridge is disposed facing towards a door of the train, and the starting covered bridge is provided with a first walking board therein for passengers to get on and off;

the first straightened covered bridge is telescopically supported in the starting covered bridge, the first straightened covered bridge comprises: a first covered bridge part and a second covered bridge part, and the first covered bridge part and the second covered bridge part are sequentially arranged along a telescopic direction; the second covered bridge part is provided with a second walking board therein for the passengers to get on and off, the second walking board is superposed on the first walking board, and the second walking board is linearly and slidably connected to the first walking board along the telescopic direction; an installation end of the first drive assembly is installed on the starting covered bridge, a moving end of the first drive assembly is installed on the first covered bridge part, an installation end of the second drive assembly is installed on the first covered bridge part, a moving end of the second drive assembly is installed on the second covered bridge part; the first drive assembly is configured to drive the first straightened covered bridge to move linearly along the telescopic direction, to thereby make the second walking board to move to a first swinging position relative to the first walking board; and in the first swinging position, the second covered bridge part completely extends out of the starting covered bridge, and the second drive assembly is configured to drive the second covered bridge part to swing horizontally relative to the first covered bridge part;

the second straightened covered bridge is telescopically supported in the second covered bridge part, the second straightened covered bridge comprises: a third covered bridge part and a fourth covered bridge part, and the third covered bridge part and the fourth covered bridge part are sequentially arranged along the telescopic direction; the fourth covered bridge part is provided with a third walking board therein for the passengers to get on and off, the third walking board is superposed on the second walking board, and the third walking board is linearly and slidably connected to the second walking board along the telescopic direction; an installation end of the third drive assembly is installed on the second covered bridge part, a moving end of the third drive assembly is installed on the third covered bridge part, an installation end of the fourth drive assembly is installed on the third covered bridge part, and a moving part of the fourth drive assembly is installed on the fourth covered bridge part; the third drive assembly is configured to drive the second straightened covered bridge to move linearly along the telescopic direction, to thereby make the third walking board to move to a second swinging position relative to the second walking board; and in the second swinging position, the fourth covered bridge part completely extends out of the second covered bridge part, and the fourth drive assembly is configured to drive the fourth covered bridge part to swing horizontally relative to the third covered bridge part; and an end of the second straightened covered bridge is provided with a circular installation position, the circular installation position is connected to the platform through the corrugated telescopic sleeve, and the starting covered bridge, the first straightened covered bridge and the second straightened covered bridge are accommodated in the corrugated telescopic sleeve.

8. The vacuum pipeline magnetic levitation conveying device as claimed in claim 7, wherein the connection unit further comprises: a connection covered bridge and a fifth drive assembly;

the connection covered bridge is telescopically supported in the fourth covered bridge part, and the fourth covered bridge part is provided with a fourth walking board therein for the passengers to get on and off; the fourth walking board is superposed on the third walking board, and the fourth walking board is linearly and slidably connected to the third walking board along the telescopic direction; an installation end of the fifth drive assembly is installed on the fourth covered bridge part, a moving end of the fifth drive assembly is installed on the connection covered bridge; the fifth drive assembly is configured to drive the connection covered bridge to move linearly along the telescopic direction, to thereby make the fourth walking board to move to a connecting position relative to the third walking board; and in the connecting position, a second end of the connection covered bridge is connected to the door of the train; and an end of the connection covered bridge is provided with a circular installation position, the circular installation position of the connection covered bridge is connected to the platform through the corrugated telescopic sleeve, and the starting covered bridge, the first straightened covered bridge, the second straightened covered bridge and the connection covered bridge are accommodated in the corrugated telescopic sleeve.

9. The vacuum pipeline magnetic levitation conveying device as claimed in claim 7, wherein the second drive assembly and the fourth drive assembly are both hydraulic cylinders.

10. The vacuum pipeline magnetic levitation conveying device as claimed in claim 1, wherein the moving and fixed track coupling part comprises: an electromagnetic damper sleeved outside the convex part.

11. The vacuum pipeline magnetic levitation conveying device as claimed in claim 1, wherein the three moving tracks are a first moving track, a second moving track and a third moving track, respectively; each of the three moving tracks is composed of a plurality of track groups sequentially arranged along an extension direction of the train, and each of the plurality of track groups is composed of a plurality of track blocks sequentially arranged along the extension direction of the train; in the first moving track, an interval between adjacent two of the plurality of track groups is in a range of 20-120 cm, in each of the plurality of track groups of the first moving track, an interval between adjacent two of the plurality of track blocks is in a range of 0.3-0.9 cm, and a length of each of the plurality of track blocks is in a range of 10-30 cm; in the second moving track, an interval between adjacent two of the plurality of track groups is in a range of 20-120 cm, in each of the plurality of track groups of the second moving track, an interval between adjacent two of the plurality of track blocks is in a range of 1.4-2.2 cm, and a length of each of the plurality of track blocks is in a range of 10-30 cm; in the third moving track, an interval between adjacent two of the plurality of track groups is in a range of 20-120 cm, in each of the plurality of track groups of the third moving track, an interval between adjacent two of the plurality of track blocks is in a range of 1.4-2.2 cm, and a length of each of the plurality of track blocks is in a range of 10-30 cm.

12. The vacuum pipeline magnetic levitation conveying device as claimed in claim 8, wherein a first end of the first straightened covered bridge corresponds to the first end of the starting covered bridge, and a second end of the first straightened covered bridge corresponds to the second end of the starting covered bridge; a first end of the second straightened covered bridge corresponds to the first end of the first straightened covered bridge, and a second end of the second straightened covered bridge corresponds to the second end of the first straightened covered bridge; and a first end of the connection covered bridge corresponds to a first end of the fourth covered bridge part, and a second end of the connection covered bridge corresponds to a second end of the fourth covered bridge part.

13. The vacuum pipeline magnetic levitation conveying device as claimed in claim 7, wherein the second drive assembly comprises: a first hydraulic cylinder and a second hydraulic cylinder; an installation end of the first hydraulic cylinder is hinged on a middle of a top of the first covered bridge part in a left-right direction, and a moving end of the first hydraulic cylinder is hinged on a left side of a top of the second covered bridge part; and an installation end of the second hydraulic cylinder is hinged on a middle of a bottom of the first covered bridge part in the left-right direction, and a moving end of the second hydraulic cylinder is hinged on a right side of a bottom of the second covered bridge part.

14. The vacuum pipeline magnetic levitation conveying device as claimed in claim 13, wherein the fourth drive assembly comprises: a third hydraulic cylinder and a fourth hydraulic cylinder; an installation end of the third hydraulic cylinder is hinged on a middle of a top of the third covered bridge part in the left-right direction, and a moving end of the third hydraulic cylinder is hinged on a left side of a top of the fourth covered bridge part; and an installation end of the fourth hydraulic cylinder is hinged on a middle of a bottom of the third covered bridge part in the left-right direction, and a moving end of the fourth hydraulic cylinder is hinged on a right side of a bottom of the third covered bridge part.

15. A vacuum pipeline magnetic levitation conveying device, comprising:
a vacuum pipeline, a train, three fixed tracks and a plurality of sites; wherein the plurality of sites are sequentially connected through the vacuum pipeline; the three fixed tracks are parallel to each other and disposed in the vacuum pipeline, and the three fixed tracks each extend along an extension direction of the vacuum pipeline; the three fixed tracks together define a circumscribed circle, and the three fixed tracks are evenly distributed at an angle of 120° from each other on the circumscribed circle; the train is disposed in the vacuum pipeline, a body of the train is provided with three moving tracks, the three moving tracks are parallel to each other and evenly distributed around the train; and the three moving tracks correspond to the three fixed tracks one by one, and the three moving tracks are respectively coupled to the three fixed tracks in a magnetic levitation manner;
wherein the vacuum pipeline comprises: an inner pipeline and an outer pipeline sleeved outside the inner pipeline, the train and the three fixed tracks are disposed in the inner pipeline, an inner space of the inner pipeline is evacuated to 1‰-0.1‰ of a standard atmospheric pressure, and a space between the inner pipeline and the outer pipeline is evacuated to 1%-4% of the standard atmospheric pressure.

16. A vacuum pipeline magnetic levitation conveying device, comprising:
a vacuum pipeline, a train, three fixed tracks and a plurality of sites; wherein the plurality of sites are sequentially connected through the vacuum pipeline; the three fixed tracks are parallel to each other and disposed in the vacuum pipeline, and the three fixed tracks each extend along an extension direction of the vacuum pipeline; the three fixed tracks together define a circumscribed circle, and the three fixed tracks are evenly distributed at an angle of 120° F.rom each other on the circumscribed circle; the train is disposed in the vacuum pipeline, a body of the train is provided with three moving tracks, the three moving tracks are parallel to each other and evenly distributed around the train; and the three moving tracks correspond to the three fixed tracks one by one, and the three moving tracks are respectively coupled to the three fixed tracks in a magnetic levitation manner;

wherein the vacuum pipeline magnetic levitation conveying device further comprises: a connection unit; the connection unit comprises: a platform, a starting covered bridge, a first straightened covered bridge, a second straightened covered bridge, a first drive assembly, a second drive assembly, a third drive assembly, a fourth drive assembly and a corrugated telescopic sleeve; and a first end of the starting covered bridge is fixedly connected to the platform, a second end of the starting covered bridge is disposed facing towards a door of the train, and the starting covered bridge is provided with a first walking board therein for passengers to get on and off;

the first straightened covered bridge is telescopically supported in the starting covered bridge, the first straightened covered bridge comprises: a first covered bridge part and a second covered bridge part, and the first covered bridge part and the second covered bridge part are sequentially arranged along a telescopic direction; the second covered bridge part is provided with a second walking board therein for the passengers to get on and off, the second walking board is superposed on the first walking board, and the second walking board is linearly and slidably connected to the first walking board along the telescopic direction; an installation end of the first drive assembly is installed on the starting covered bridge, a moving end of the first drive assembly is installed on the first covered bridge part, an installation end of the second drive assembly is installed on the first covered bridge part, a moving end of the second drive assembly is installed on the second covered bridge part; the first drive assembly is configured to drive the first straightened covered bridge to move linearly along the telescopic direction, to thereby make the second walking board to move to a first swinging position relative to the first walking board; and in the first swinging position, the second covered bridge part completely extends out of the starting covered bridge, and the second drive assembly is configured to drive the second covered bridge part to swing horizontally relative to the first covered bridge part;

the second straightened covered bridge is telescopically supported in the second covered bridge part, the second straightened covered bridge comprises: a third covered bridge part and a fourth covered bridge part, and the third covered bridge part and the fourth covered bridge part are sequentially arranged along the telescopic direction; the fourth covered bridge part is provided with a third walking board therein for the passengers to get on and off, the third walking board is superposed on the second walking board, and the third walking board is linearly and slidably connected to the second walking board along the telescopic direction; an installation end of the third drive assembly is installed on the second covered bridge part, a moving end of the third drive assembly is installed on the third covered bridge part, an installation end of the fourth drive assembly is installed on the third covered bridge part, and a moving part of the fourth drive assembly is installed on the fourth covered bridge part; the third drive assembly is configured to drive the second straightened covered bridge to move linearly along the telescopic direction, to thereby make the third walking board to move to a second swinging position relative to the second walking board; and in the second swinging position, the fourth covered bridge part completely extends out of the second covered bridge part, and the fourth drive assembly is configured to drive the fourth covered bridge part to swing horizontally relative to the third covered bridge part; and an end of the second straightened covered bridge is provided with a circular installation position, the circular installation position is connected to the platform through the corrugated telescopic sleeve, and the starting covered bridge, the first straightened covered bridge and the second straightened covered bridge are accommodated in the corrugated telescopic sleeve.

* * * * *